United States Patent [19]

Tao et al.

[11] Patent Number: 5,250,185
[45] Date of Patent: Oct. 5, 1993

[54] REDUCING AQUEOUS BORON CONCENTRATIONS WITH REVERSE OSMOSIS MEMBRANES OPERATING AT A HIGH PH

[75] Inventors: Fansheng T. Tao, Sugar Land, Tex.; Paul F. Pilger, Denver, Colo.; Charles A. Dyke, Beacon, N.Y.

[73] Assignee: Texaco Inc., White Plains, N.Y.

[21] Appl. No.: 877,689

[22] Filed: May 1, 1992

[51] Int. Cl.⁵ .............................................. B01D 61/02
[52] U.S. Cl. ................................ 210/654; 210/500.38
[58] Field of Search ............... 210/638, 655, 634, 639, 210/644, 649–654, 500.37, 500.38

[56] References Cited

U.S. PATENT DOCUMENTS 3,953,580  4/1976  Allen et al. .......................... 210/655
4,755,298  7/1988  Grinstead ............................ 210/638

Primary Examiner—Frank Sever
Attorney, Agent, or Firm—James L. Bailey; Jack H. Park; Harold J. Delhommer

[57] ABSTRACT

A method of treating an aqueous charge liquid, such as oilfield produced waters, containing boron and solubilized hydrocarbon compounds to reduce boron concentration, which comprises water softening to remove substantially all divalent cations, raising the pH of the liquid above about 9.5, and driving the liquid through a reverse osmosis membrane.

9 Claims, No Drawings

REDUCING AQUEOUS BORON CONCENTRATIONS WITH REVERSE OSMOSIS MEMBRANES OPERATING AT A HIGH PH

BACKGROUND OF THE INVENTION

This invention relates to the removal of solutes from aqueous solvent with reverse osmosis membranes. More particularly, the invention concerns the substantial removal of boron solute by operating the membrane at a relatively high pH.

As is well known to those skilled in the art, wastewater may contain a wide variety of undesirable components which restrict its use or disposal. As time passes, standards regulating the content of wastewater disposed into natural bodies of water or injected underground have become more and more strict. One industrial wastewater which may be produced in large quantities is oilfield produced water, produced concurrently with hydrocarbon production.

Produced water contains a wide variety of components depending upon its origin and the particular underground reservoir. Typically, a substantial portion of produced water is recovered including formation water and injected water. Formation water is that water which is naturally present in the oil or gas reservoir. It may amount to as little as 1% by volume at the beginning of production, but typically increases during the life of the well. Injected water is water which has been injected into the underground reservoir to enhance hydrocarbon recovery. This may be done by water flooding, surfactant flooding, steam flooding or other enhanced oil recovery processes. In such enhanced oil recovery processes, it is not unusually to have produced water comprising 90-95% of the produced fluids. Although the oil may have considerable value, produced water is a problem, requiring substantial cost and effort for disposal. In locations such as California, standards have become so strict that in many cases, the produced water cannot be disposed of by reinjection or by discharge into a local river, even though the produced water has less of a certain solute than it did before the oil company obtained the water from the same river.

Most produced water contains high concentrations of various water-soluble salts typified by those present in sea water. Most formation water is a high salt concentration brine. Frequently, the water that is injected into a formation in an enhanced oil recovery process is also brine. In most areas of the world, fresh water is more costly and not as abundant as brine. And even when a fresh water is injected into an underground hydrocarbon reservoir such as in steam flooding, the water may pick up substantial solutes during its passage through the underground reservoir.

Produced water also commonly contains immiscible hydrocarbons, dissolved hydrocarbons of all kinds including such carcinogens as benzene, toluene and xylene, dissolved water-soluble organic electrolytes such as fatty acids, carboxylic acids and phenols, and numerous other elements and compounds.

In California, boron poses a particular solute problem in produced waters. Boron, contained in sea water in a typical concentration of about 4.6 mg/L, is easily tolerated by humans at similar concentrations (as witnessed by drinking water standards). Citrus plants, however, are troubled with boron toxicity at low levels. The current California standard for irrigation water is a maximum of 0.75 mg/L. Oil companies have found it quite difficult and costly to reduce boron levels below 0.75 mg/L. This must be done even though the original source of the water prior to the water being obtained and injected by the oil company had a boron concentration higher than the standard. At present, this standard can only be met by the use of costly ion exchange resins. Membrane systems have failed to perform effectively due to fouling problems (frequently from dissolved hydrocarbons) and insufficiently high rejection rates for boron.

Numerous reverse osmosis membrane systems are used world-wide to desalinate seawater for potable water and irrigation purposes. In this use, boron solute concentrations are reduced. However, processing seawater with reverse osmosis membranes does not pose the same technical problems as processing oilfield produced waters containing solubilized oil, numerous other contaminates, and sometimes boron concentrations ranging as high as 20-50 mg/L.

Most of the world's boron is contained in seawater. But pure supplies of sodium borate exists in arid regions where inland seas have evaporated to dryness, especially in volcanic areas. Boron is frequently present in fresh water supplies from the same geological areas, such as California.

The *Nalco Water Handbook*, copyright 1988 by McGraw-Hill, notes that boron is present in water as nonionized boric acid, $B(OH)_3$. At a high pH over 10, most boron is present as the borate anion, $B(OH)_4^-$. It is known that borate rejection by reverse osmosis membranes may increase with increasing feedwater pH. A graph of borate rejection by a DuPont membrane (B-9) plotting boron rejection versus feedwater pH was received from Infilco Degremont. The graph indicates borate rejections of 95% at a Ph of 10 or higher for the particular DuPont membrane.

Unfortunately, most reverse osmosis membranes are susceptible to degradation when operated at a feedwater pH of 10-11 or higher. In addition, the problems posed to membrane operation by produced waters containing numerous solutes including solubilized oil pose substantially different operating conditions than the seawater feed normally used with reverse osmosis membranes. Furthermore, calcium and magnesium scale poses a considerable fouling problem to reverse osmosis membranes at an operational pH of 10-11.

For reverse osmosis membranes, a charge liquid containing a more permeable and a less permeable component is maintained in contact under pressure with a non-porous separating layer. In a reversal of the cellular osmotic process, a portion of the charge liquid, predominately liquid, dissolves into the membrane and diffuses through with a decreased concentration of salts. Usually, a substantial portion of the solutes are left behind as the retentate.

One of the leading categories of reverse osmosis membranes are those composite membranes prepared from polyamides. As is the case with reverse osmosis membranes in general, the literature is voluminous with disclosures of different polyamide membranes. Polyamide membranes are described in U.S. Pat. Nos. 3,567,632; 3,600,350; 3,687,842; 3,696,031; 3,744,642; 3,878,109; 3,904,519; 3,948,823; 3,951,789; 3,951,815; 3,993,625; 4,005,012; 4,039,440; 4,259,183; 4,277,344; 4,812,238; 4,859,384; 4,888,116; 4,960,517; 4,964,998; and numerous others.

Various chemical processes have been developed wherein the pH of the aqueous liquid is raised or lowered for better reaction or separation purposes. An example of this is disclosed in U.S. Pat. No. 4,818,410 wherein water is treated by acidifying the fluid to a pH of 6 or lower with a strong acid to aid in separating water soluble organics from water to an oil phase.

U.S. Pat. No. 5,028,336 discloses a process of elevating pH to aid in the separation process with a polysulfone composite membrane. More particularly, the pH of an oilfield produced water in the range of 4–7 is raised to a pH of 7–9 to gain better rejection of water soluble organic electrolytes such as fatty acids, carboxylic acids and phenols.

SUMMARY OF THE INVENTION

The invention is a method of treating an aqueous charge liquid, such as oilfield produced waters, containing boron and solubilized hydrocarbon compounds to substantially reduce boron concentration. The multi-step method comprises adding a water softener to an aqueous charge liquid containing boron and solubilized hydrocarbon compounds to remove substantially all divalent ions from the aqueous charge liquid, and raising the pH of the aqueous charge liquid to about 9.5 to about 11.5. The liquid is then passed into contact with the high pressure side of a reverse osmosis membrane.

An aqueous permeate containing less than about 2 mg/L boron is recovered from the low pressure side of the reverse osmosis membrane. An aqueous retentate or reject having a substantially higher concentration of boron than the feedwater is recovered from the high pressure side of the membrane.

Preferably, the reverse osmosis membrane is a composite polyamide membrane. More preferably, the membrane is a crosslinked, interfacially polymerized, aromatic polyamide membrane.

DETAILED DESCRIPTION

Produced waters from some California hydrocarbon reservoirs have high boron concentrations. For example, the San Ardo field produces large volumes of water with boron concentrations ranging from about 15–34 mg/L. Current California standards require the reduction of boron levels to 0.75 mg/L in order to meet the regulatory standard for irrigation water. It is expensive to use specific ion exchange resins to efficiently reduce the boron levels to California discharge standards.

In an effort to lower the cost of water processing, we investigated the use of reverse osmosis membranes. None of the membrane companies or consultants that we asked for information from thought rejecting boron in any significant manner would be possible. Although it was pointed out to us that reverse osmosis membranes reject boron from seawater to some degree, it was not thought possible to achieve the boron rejections of 98% plus required to lower boron concentrations from about 30 to below 0.75 mg/L in the permeate. Instead, we were cautioned about problems ranging from soluble oil to scale.

We discovered that boron rejections of 98% plus were obtainable with reverse osmosis membranes operated at an abnormal and unusually high pH, which is at or above the operating limits of most reverse osmosis membranes. The high pH operations also unexpectedly reduced the membrane fouling tendencies due to soluble oil. Capitol costs were reduced for wastewater treatment because ion exchange resins were no longer needed for boron removal and units for bacteria control could be eliminated. The high pH made them unnecessary. Finally operating costs were reduced due to less chemicals being needed in other wastewater treatment steps.

Our invention is a method of treating an aqueous charge liquid, such as oilfield produced water, containing boron and solubilized hydrocarbon compounds to substantially reduce boron concentration. The invention is a multi-step method, wherein the first step comprises adding a water softener to an aqueous charge liquid containing boron and solubilized hydrocarbons or passing the liquid through a water softening bed to remove substantially all of the divalent ions from the liquid. The pH is raised to above 9.5, preferably above about 10.5. The liquid is then passed into contact with the high pressure side of a reverse osmosis membrane. An aqueous permeate containing less than about 2 mg/L boron, preferably less than about 0.75 mg/L boron, is recovered from the low pressure side of the reverse osmosis membrane. An aqueous retentate or reject having a substantially higher concentration of boron than the feedwater is recovered from the high pressure side of the membrane.

Running at a high pH, preferably above about 10.5, substantially increases the boron and soluble oil removal across the reverse osmosis membrane. In one field test, we achieved a 99.34% boron rejection rate while operating at a feedwater pH of 10.5. Total organic carbon (mostly soluble oil) was reduced from 171 mg/L to 1.5 mg/L, a rejection rate of over 99%. A significant advantage was that the high pH operation stabilized (increased) the solubility of the soluble oil in the water so that it did not precipitate and foul the membrane.

It is necessary to substantially remove divalent cation hardness such as calcium and magnesium from the feedwater before entering the reverse osmosis unit so that calcium-based and magnesium-based mineral scales do not precipitate on and foul the membrane. Zeolite softeners, weak acid softeners, organic chelating agents such as ethylenediamine tetraacetic acid (EDTA), combinations thereof, or other softening procedures may be used to remove the divalent ions.

A preferred procedure is the use of a conventional zeolite softener followed by a weak acid softener. This is because a zeolite softening bed leaks hardness (divalent cations) when the feedwater has a salt content of about 5000–7000 ppm TDS or above. The exit flow may contain 0.5 to 1 ppm TDS or higher calcium and magnesium cations, which could provide a scale problem at a pH of 10.5 or above. A weak acid softening bed will remove most of the remaining cations. At present prices, weak acid or EDTA softening alone are most costly.

The use of softeners to reduce calcium concentration to at least 0.5 mg/L and magnesium concentration to 0.15 mg/L or lower eliminates scaling possibilities. However, at the preferred extreme pH operating range above about 10.5, the scale point may exist at only a few tenths of mg/L. Thus, even at 0.5 mg/L of calcium, calcite scale may occur. In the real world, of course, upsets in feedwater concentrations will probably occur. Consequently, when operating at such a high pH, it may be desirable to add a scale inhibitor to the membrane feedwater to further reduce the possibility of scaling. Numerous scale inhibitors are known to those skilled in the art. EDTA is only one possibility. Scale inhibitors containing dispersants may also be desirable.

In a production sized operation processing 25,000 barrels per day of water, a 1 mg/L oversaturation of calcium carbonate can represent a potential scale buildup of about 9 lbs. per day. To avoid damaging the reverse osmosis membrane, it is preferred to use some sort of chelating agent or scale inhibitor.

Preferably, the reverse osmosis membrane is a composite polyamide membrane. Our best results have been achieved with a commercial membrane sold under the trademark SW30HR 2540 by Filmtec Corporation. This is advertised as a high rejection seawater membrane according to Filmtec. The 2540 coding refers to the actual size of the membrane. The ones used in pilot tests have a diameter of 2.5 inches and a length of 40 inches in a spiral wound configuration. A full scale operation may use larger membranes having commercially available diameters of eight inches or greater and lengths of eighty inches or greater. This particular membrane is referred to as a high sodium chloride rejection seawater membrane and is marketed for desalination purposes. It is not a chlorine resistant membrane and cannot be cleaned with bleach.

It is believed that this trademark Filmtec membrane is a crosslinked, interfacially polymerized, aromatic polyamide membrane. Membranes of this type are described in U.S. Pat. No. 4,277,344 and Cadotte, John E., "Evolution of Composite Reverse Osmosis Membranes", *Materials Science of Synthetic Membranes*, American Chemical Society, Symposium Series 269, 1985, p. 285-294, both disclosures of which are incorporated herein by reference.

As with any membrane system, pretreatment equipment may be needed to produce a reverse osmosis membrane feedwater of acceptable quality. The water entering the reverse osmosis membrane unit should meet common reverse osmosis feedwater requirements for turbidity (less than 1.0 Nephlometric Turbidity Unit (NTU) and silt density index (less than 3.0). The turbidity requirements from membrane to membrane of 1.0 NTU to 0.1 NTU are common. It may be as high as 2.0 NTU for some membranes in a plate-and-frame configuration.

The pH of the aqueous charge liquid must be raised above 9.5, preferably above about 10.5. Currently available reverse osmosis membranes are unable to operate above a pH of about 11 to 11.5. But this may change in the future. A future membrane capable of operation at a pH of 12 may prove to be even more effective in the invention method. However, care must be taken when operating close to pH 11 due to the ease with which scale can form, and coat and possibly damage the membrane. This must be balanced against the high pH advantages of greater solubility of soluble oils and increased boron rejection.

The pH of the aqueous liquid may be adjusted by a variety of techniques. One method is by passage through a bed of cation exchange resin, such as a sulfonated polystyrene, or more commonly by addition of a Bronsted base, typified by sodium carbonate, calcium hydroxide (lime), sodium hydroxide, sodium bicarbonate and others. It should be apparent, however, that additional of certain Bronsted bases have a disadvantage in that they introduce undesirable anions into the system. The preferred bases include hydroxides of alkali metals, and most preferably, calcium hydroxide and sodium hydroxide. In our pilot process, the initial warm lime treatment with calcium hydroxide raised pH above 11. During subsequent treating cut steps, the pH was adjusted to about 10.5 to 10.6 prior to entering the reverse osmosis membrane.

The reverse osmosis membrane used in this invention method may be utilized in various configurations. It is possible to use a composite membrane in a plate-and-frame configuration in which separating layers may be mounted on the porous support layer with the carrier layer. A plate-and-frame configuration is commonly seen by those skilled in the art as a better configuration for resisting fouling than the spiral wound.

Currently preferred is a spiral wound configuration. A single-leaf element includes a non-porous separating layer membrane attached to a microporous intermediate layer and a support or backing layer, the membrane assembly being typically folded in half with the separating layer on the inside. A plastic net, serving as the feed spacer, is placed between the folded halves. A permeate discharge channel sheet, typically formed of a stiff fabric, is placed on the top of the other layers. The dimensions of this assembly are calculated to result in an element of the desired length and diameter when rolled. At four inches or larger diameters, typically three or more leaves are rolled simultaneously in a multi-leaf construction.

This assembly is wrapped around a preferably cylindrical conduit which bears a plurality of wall perforations in a linear array as long as the width of the membrane sheets. The discharge channel sheet of the assembly is rolled around the perforations of the conduit, and the assembly is wrapped around the conduit and glued along the outside and final edges to form a spiral wound configuration. The feed channel(s) in the spiral wound assembly are adjacent to two faces of the membrane layer. The feed channel is formed from the rolling operation.

The unit is fitted within a pressure vessel provided with end caps for brine connections at one end and brine and permeate connections at the other end. A U-cup seal between the inner surface of the pressure vessel shell and the outer surface of the spiral wound element prevents fluid from bypassing the feed channel(s). The permeate passes from the feed channel, through the separating layer, through the other membrane layers into the permeate channel, and then to and through the perforations in the conduit through which it is withdrawn as permeate.

In use of the spiral wound membrane, charge liquid passes around the plastic net which serves as a feed channel and into contact with the separating membranes. The liquid which does not pass through the membranes is withdrawn as reject. The liquid which permeates the membrane passes into the volume occupied by the permeate spacer and through this permeate channel to the perforations in the cylindrical conduit through which it is withdrawn from the system.

In another embodiment, it is possible to utilize the membrane as a tubular or hollow fiber. Modern design technology typically has the feed flowing on the outside of the hollow fibers, especially if the feed is slightly turbid. But in general, hollow fibers foul readily in marginal reverse osmosis membrane feeds like wastewater.

The following pilot test example will further illustrate the present invention which discloses a high pH method of treating an aqueous charge liquid containing boron and solubilized hydrocarbon compounds to substantially reduce boron concentrations. This example is given by way of illustration and not as a limitation on the scope of the invention. Thus, it should be understood that reaction steps and amounts may be varied with the process still remaining within the scope of the invention.

EXAMPLE

PILOT TEST

A pilot water treatment system which included the invention method was set up to process produced water from a steam flood at San Ardo, Calif. The process was designed to discharge wastewater according to California irrigation water standards into a local river rather than injection underground. Underground injection as a disposal technique has become difficult and costly in California.

The pilot process for produced water began after a water/oil separation system. The hot steam flood water was treated in a warm lime unit with lime and magnesium chloride used for silica removal. A flocculation polymer sold under the trademark Betz 1125L by Betz Laboratories, Inc., and ferric chloride were used for clarification. The clarified water had a silica concentration below 30 mg/L, turbidity below 1.0 NTU, and a pH value of about 11.4. The low silica concentration was necessary to keep the reverse osmosis membrane from fouling with silica precipitates.

The water was pumped into a turbine flow meter for proportionate control of the injection rate of polyaluminum chloride to provide further coagulation of oil and solids. Suspended solids were removed by a 5 micron cartridge filter followed by a 0.45 micron cartridge filter. Water clarity after filtration was generally in the range of about 0.25-0.35 NTU. The water was then passed into the reverse osmosis membrane system at a pH of about 10.5.

The pilot test process including the reverse osmosis membrane system, was operated successfully at pressures from 350 to 575 psig, temperatures between about 85° F. and 110° F., feed rates of up to 5 gallons per minute and feedwater recoveries of 75% as permeate. Table 1 shows the results of employing the process on the wastewater stream, wherein feed was provided to the membrane at a pH of 10.5. Boron was reduced from 23 mg/L to 0.28 mg/L, a 98.8% removal; and 99.34% rejection.

TABLE 1

SAN ARDO PILOT TEST

| | pH | Boron | Na$^+$ | Ca$^{+2}$ | Ba | SiO$_2$ | K$^+$ | Cl$^-$ | SO$_4$$^{-2}$ | CO$_3$$^{-2}$ | OH$^-$ | TOC* |
|---|---|---|---|---|---|---|---|---|---|---|---|---|
| | | | | | Concentration mg/L | | | | | | | |
| Feed | 10.5 | 23.0 | 2580 | 0.09 | 0.001 | 23.6 | 16 | 2908 | 178 | 109 | 177 | 171 |
| Permeate | 10.6 | 0.28 | 33.0 | 0 | 0.001 | 8.6 | 0.6 | 21.0 | 1.5 | 16.8 | 30.6 | 1.5 |
| Retentate | 10.8 | 89 | 10,200 | — | — | 71 | 70 | 12,965 | 824 | 402 | 331 | 699 |

*TOC is Total Organic Carbon

COST

Based on the recent operating data of the San Ardo pilot water treatment project, the operating cost for a commercial system which includes the boron recovery method of the present invention as well as other processing described above is estimated to be about 5.0-6.3 cents per barrel for a 75% recovery of 50,000 barrels per day of produced water. This cost is based on the total throughput of the produced water at the plant.

If the cost is based upon the amount of the permeate disposal water, it would rise to about 7.0-8.0 cents per barrel when operated at high pH values according to the invention with a 75% recovery of permeate water. Cost for a low pH system (7.5) not according to the present invention is estimated to be 14.6 cents per barrel with a 50% recovery of permeate water (37,500 barrels/day) from an input of 75,000 barrels/day of produced water.

Many other variations and modifications may be made in the concepts described above by those skilled in the art without departing from the concepts of the present invention. Accordingly, it should be clearly understood that the concepts disclosed in the description are illustrative only and are not intended as limitations on the scope of the invention.

What is claimed is:

1. A method of treating an aqueous charge liquid containing boron and solubilized hydrocarbon compounds to substantially reduce boron concentration, which comprises:
   passing an aqueous charge liquid containing boron and solubilized hydrocarbon compounds through a water softener to remove substantially all divalent cations from the aqueous charge liquid;
   raising the pH of the aqueous charge liquid above about 9.5;
   passing the aqueous charge liquid into contact with the high pressure side of a reverse osmosis membrane, said reverse osmosis membrane being a cross-linked, interfacially polymerized, aromatic polyamide membrane having properties sufficient to resist degradation under a pH above about 9.5;
   recovering from the low pressure side of the reverse osmosis membrane an aqueous permeate containing less than about 2 mg/L boron; and
   recovering from the high pressure side of the reverse osmosis membrane an aqueous retentate having a substantially higher concentration of boron.

2. The method of claim 1, wherein the aqueous charge liquid is produced water from an oilfield.

3. The method of claim 1, wherein the pH of the aqueous charge is raised above about 10.5.

4. The method of claim 1, wherein the boron concentration of the permeate is less than about 0.75 mg/L.

5. The method of claim 1, wherein a zeolite softener, weak acid softener, organic chelating agent, or combination thereof is used to remove divalent cations.

6. The method of claim 1, wherein the divalent cation concentration is reduced to less than about 0.5 mg/L of calcium and 0.15 mg/L of magnesium.

7. The method of claim 1, wherein the pH of the aqueous charge is raised by the addition of calcium hydroxide.

8. The method of claim 1, wherein a scale inhibitor is added to the aqueous charge liquid.

9. A method of treating oilfield produced water to substantially reduce boron concentration, which comprises:

passing an oilfield produced water containing boron and solubilized hydrocarbon compounds through a water softener to remove divalent cations from the water leaving a concentration below about 0.5 mg/L calcium and 0.15 mg/L magnesium;

raising the pH of the water above about 10.5:

passing the water into contact with the high pressure side of a composite cross-linked, interfacially polymerized, aromatic polyamide reverse osmosis membrane;

recovering from the low pressure side of the reverse osmosis membrane having properties sufficient to resist degradation under a pH above about 9.5 an aqueous permeate containing less than about 0.75 mg/L boron; and recovering from the high pressure side of the reverse osmosis membrane an aqueous retentate having a substantially higher concentration of boron.

* * * * *